(12) United States Patent
Utter

(10) Patent No.: US 11,055,254 B2
(45) Date of Patent: Jul. 6, 2021

(54) MIXED MEDIA ETHERNET SWITCH

(71) Applicant: The Aerospace Corporation, El Segundo, CA (US)

(72) Inventor: Alexander Clifton Utter, Hawthorne, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 16/708,306

(22) Filed: Dec. 9, 2019

(65) Prior Publication Data
US 2021/0173806 A1  Jun. 10, 2021

(51) Int. Cl.
H03M 13/00 (2006.01)
G06F 13/42 (2006.01)
H04L 12/933 (2013.01)
G06F 13/40 (2006.01)

(52) U.S. Cl.
CPC ...... *G06F 13/4282* (2013.01); *G06F 13/4022* (2013.01); *H04L 49/15* (2013.01)

(58) Field of Classification Search
CPC ................................. G06F 13/4022
USPC ......................................... 710/313
See application file for complete search history.

(56) References Cited

U.S. PATENT DOCUMENTS

| | | | | |
|---|---|---|---|---|
| 6,738,821 B1 * | 5/2004 | Wilson | ............... | H04L 12/413 709/220 |
| 7,031,904 B1 * | 4/2006 | Wilson | ............... | H04L 67/1097 370/338 |
| 7,577,136 B1 * | 8/2009 | Devanagondi | ......... | H04L 47/10 370/389 |
| 2002/0089958 A1 * | 7/2002 | Feder | ................... | H04L 69/169 370/338 |
| 2004/0123220 A1 * | 6/2004 | Johnson | ............... | H04J 3/1617 714/774 |
| 2007/0047540 A1 * | 3/2007 | Bragg | ................... | H04L 49/30 370/386 |
| 2010/0316100 A1 * | 12/2010 | Snauwaert | ........... | H04L 12/413 375/220 |
| 2014/0226659 A1 * | 8/2014 | Tsirkin | .................. | H04L 45/74 370/390 |

OTHER PUBLICATIONS

Gwaltney, et al., "Comparison of Communication Architectures for Spacecraft Modular Avionics Systems", NASA Technical Report, Document ID 20060050129, Jun. 1, 2006.

* cited by examiner

*Primary Examiner* — Titus Wong
(74) *Attorney, Agent, or Firm* — LeonardPatel PC

(57) ABSTRACT

A mixed-media Ethernet switch (the "switch") is configured to allow a variety of devices to communicate on a given network. The switch includes a plurality of ports. Each of the plurality of ports are configured to connect with, and communicate with, a corresponding traditional medium or nontraditional medium.

21 Claims, 4 Drawing Sheets

MIXED MEDIA ETHERNET SWITCH

FIELD

The present invention relates to an Ethernet switch, and more particularly, to a mixed-media Ethernet switch (the "switch") configured to allow one or more devices to communicate on the same network.

BACKGROUND

Most low-power microcontrollers fail to include traditional Ethernet ports, and it's not something that can be implemented with software-controlled GPIO. SatCat5 allows for a microcontroller to communicate on the same Local Area Network (LAN) as one or more personal computers (PCs), one or more graphical processing unit (GPU) system-on-modules, and/or one or more field-programmable gate arrays (FPGAs).

Further, most Ethernet switches require several watts to operate. The biggest power hog in a regular Ethernet network isn't the switch logic; it's the transceivers. For example, one transceiver is required on each end of every link, with both transceivers drawing about 1 watt per port. The transceivers need this power to cross building-scale distances up to 100 meters. However, this is not required in many cases.

Accordingly, an improved Ethernet switch may be beneficial.

SUMMARY

Certain embodiments of the present invention may provide solutions to the problems and needs in the art that have not yet been fully identified, appreciated, or solved by current Ethernet switch technologies. For example, some embodiments of the present invention pertain to a mixed-media Ethernet switch (the "switch"). The switch allows a variety of devices to communicate on the same network.

In an embodiment, a switch configured to allow a variety of devices to communicate on a given network includes a plurality of ports, each of the plurality of ports are configured to connect with, and communicate with, a corresponding traditional medium or non-traditional medium.

In another embodiment, a mixed-media Ethernet switch is configured to allow a variety of devices to communicate on a given network. The mixed-media Ethernet switch includes a plurality of ports, with each port being configured to connect with, and communicate with, a corresponding traditional medium or non-traditional medium. The mixed-media Ethernet switch is also configured to deliver Ethernet frames over nontraditional media.

In yet another embodiment, a mixed-media Ethernet switch is configured to allow a variety of devices to communicate on a given network. The mixed-media Ethernet switch includes a plurality of ports, with each plurality port being configured to connect with, and communicate with, a corresponding traditional medium or non-traditional medium. The mixed-media Ethernet switch is further configured to deliver Ethernet frames over nontraditional media, and also configured to switch between nontraditional devices and media access control (MAC)-to-MAC devices in a single network.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments pertain to a mixed-media Ethernet switch (the "switch") that allows a variety of devices to communicate on the same network. Devices may include computers, sensors, actuators, appliances, etc. that act as network endpoints. Devices may also include networking equipment, such as switches, bridges, routers, modems, etc., that can be interconnected into a much larger network or even connected to the Internet as a whole. For purposes of explanation, the switch is equivalent to a typical consumer-grade switch, except that the switch delivers Ethernet frames over a nontraditional medium (or several nontraditional media). Nontraditional medium (or media) may include serial peripheral interface (SPI), universal asynchronous receiver-transmitter (UART), or inter-integrated circuit ($I^2C$) to name a few. For purposes of explanation, the term "medium" refers to a singular interface for conveying information and the term "media" refers to a plurality of interfaces. SatCat5 is the software realization of the embodiments described herein.

Some embodiments leverage the various media-independent interfaces (MII) that have become de-facto standards. These interfaces are typically used to allow an Ethernet media access control (MAC) module, to communicate with a specialized physical-layer transceiver (PHY). The PHY contains specialized circuitry to send and receive signals long distances over a specific medium, such as copper or fiber-optic cables, in accordance with standards specified by the IEEE 802.3 working group. However, most MII are highly symmetric, and require little or no adaptation to connect two MAC modules back-to-back, with no intervening PHY. Such "MAC-to-MAC" connections are commonly used for specialized short-distance communication links.

A regular Ethernet switch requires power, typically 5000-10,000 milliwatts for consumer-grade equipment. By leveraging MAC-to-MAC modes, the switch, which contains the SatCat5 software, provides the same class of high-speed gigabit Ethernet service while using a fraction of the power. A multi-port gigabit network switch can be run for less than 700 milliwatts in MAC-to-MAC mode. By leveraging non-traditional media, SatCat5 provides lower-speed Ethernet service using even less power. A SPI/UART network switch can be run for less than 100 milliwatts.

By combining both modes in a single switch, SatCat5 provides the best of both worlds by interconnecting both nontraditional media and traditional media (e.g., MAC-to-MAC devices) in a single network. Power consumption scales in proportion to the number and types of active ports, and all attached devices can interoperate seamlessly. Switch embodiments that choose to include one or more regular PHY transceivers can additionally provide compatibility with regular Ethernet, connecting devices of all types (e.g., Ethernet, MAC-to-MAC, and nontraditional media) into a single interconnected network.

Figure 1:
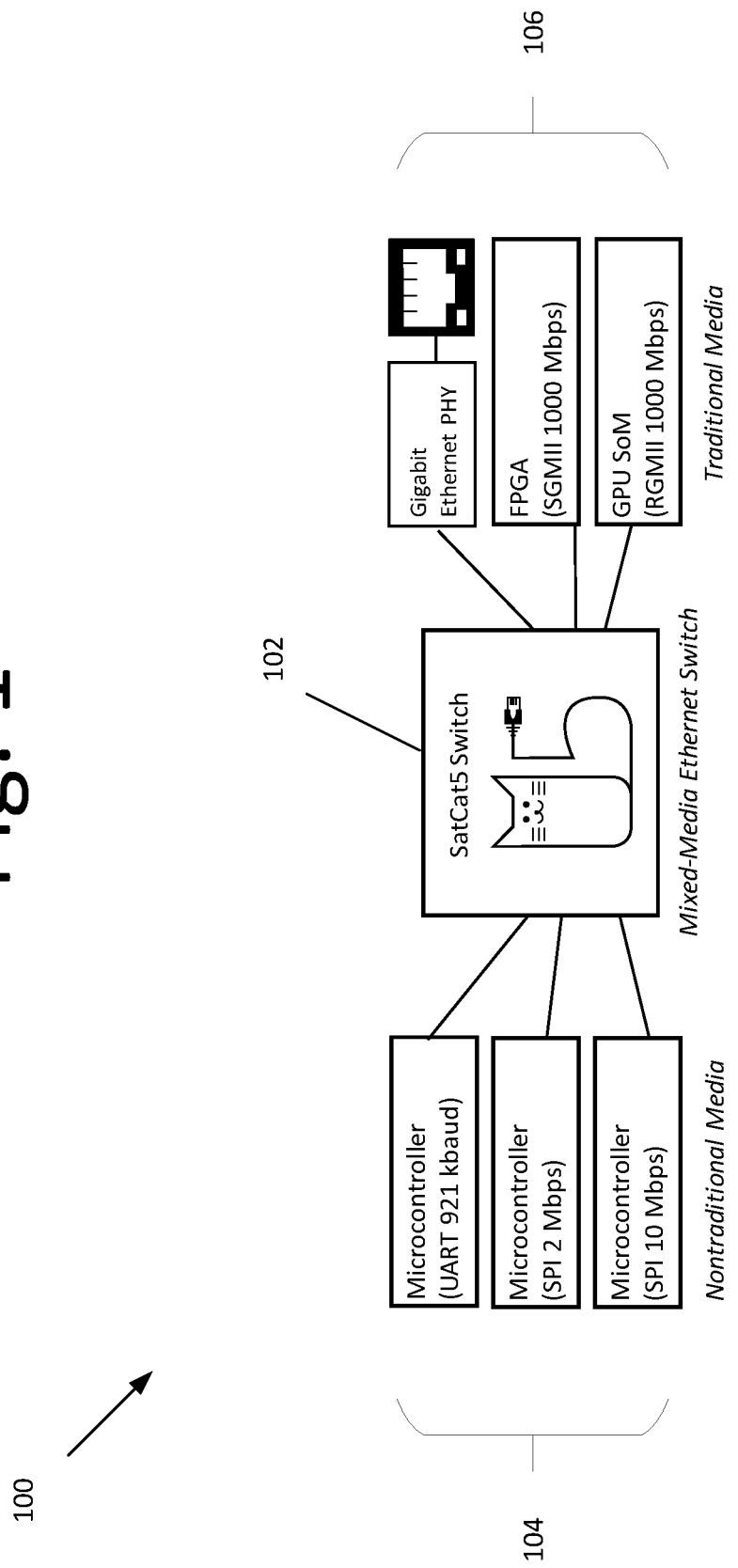
FIG. 1 is a block diagram illustrating a network comprising a switch connected to a plurality of non-traditional media and traditional media, according to an embodiment of the present invention.

FIG. 1 is a block diagram illustrating a network 100 comprising a SatCat5 switch (hereinafter referred to as "switch") 102 connected to a plurality of non-traditional media 104 and traditional media 106, according to an embodiment of the present invention. In some embodiments, switch 102 delivers Ethernet frames to nontraditional media 104, such as SPI and/or UART, and replaces dissimilar, ad-hoc, proprietary interfaces with a single communications network.

A typical consumer-grade network switch provides up to five gigabit Ethernet ports, and directs packets received from each port to the appropriate destination port(s). The switch 102 is equivalent, except that switch 102 contains ports using both a traditional (or MAC-to-MAC) mode and non-traditional media. Switch 102 itself is implemented, in some embodiments, using a field-programmable gate array (FPGA) or an application-specific integrated circuit (ASIC). A typical embodiment might provide five MAC-to-MAC ports and a dozen SPI/UART ports. Selection of SPI or UART mode can be fixed a-priori, or detected and configured automatically using various techniques known in the art. Switch 102 further contains all the digital logic required to ingest Ethernet frames from each port, read the address information contained in each frame, and direct each frame to the appropriate destination port(s). Techniques required to accomplish each step are widely known in the art; the nature of the mixed-media external interfaces makes little difference to the implementation of the network switch's internal functionality.

Figure 2:
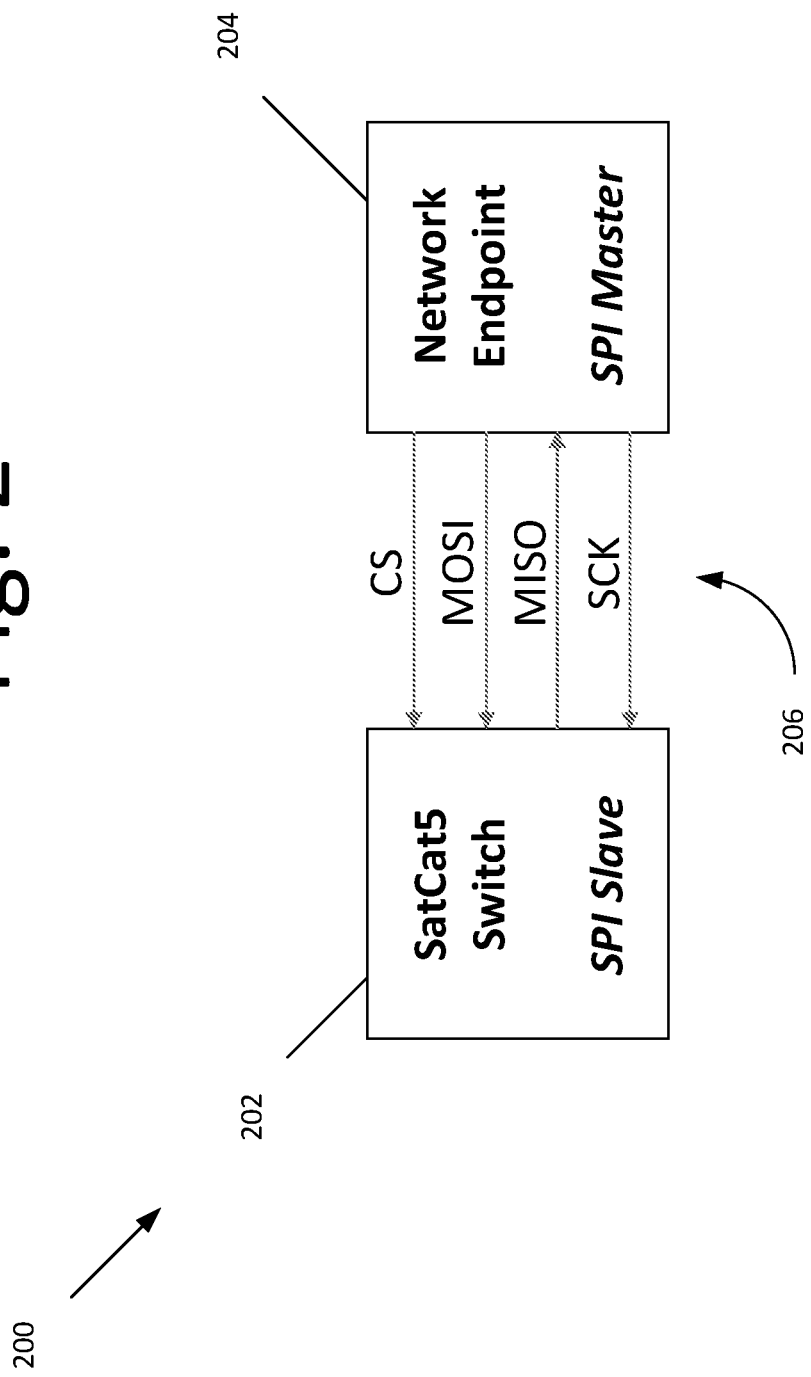
FIG. 2 is a block diagram illustrating a network comprising a switch, a network endpoint, and an SPI interface, according to an embodiment of the present invention.

FIG. 2 is a block diagram illustrating a network 200 comprising a switch 202, a network endpoint 204, and an SPI interface (i.e., CS, MOSI, MISO, and SCK) 206, according to an embodiment of the present invention. It should be appreciated that the embodiments shown in FIG. 2 are not limited to a FPGA switch 202 and other types of switches may be used depending on the embodiment.

SPI interfaces 206 are commonly used in short-distance communication, primarily in embedded systems. These interfaces typically connect a microcontroller to various peripherals, such as Secure Digital (SD) cards or display devices. In some embodiments, however, SPI interface 206 conveys Ethernet frames between network endpoint 204 and switch 202. In an embodiment, network endpoint 204 is a microcontroller with an SPI interface, switch 202 is an FPGA running SatCat5, and octets transferred through SPI interface 205 are SLIP-encoded (IETF-RFC-1055) to delimit the start and end of each Ethernet frame. In some embodiments, network endpoint 204 is not always ready to accept new data. This is typical for low-power microcontrollers, which may be intermittently busy performing other tasks. In such cases, switch 202 buffers data for later transmission, and network endpoint 204 submits a signal when it is ready or not ready to receive this data. In SPI interface 206, separate flow control signals are not required because switch 202 is always ready to accept new data, and network endpoint 204 can choose to drive the clock signal SCK when it is ready to accept new data.

Figure 3:
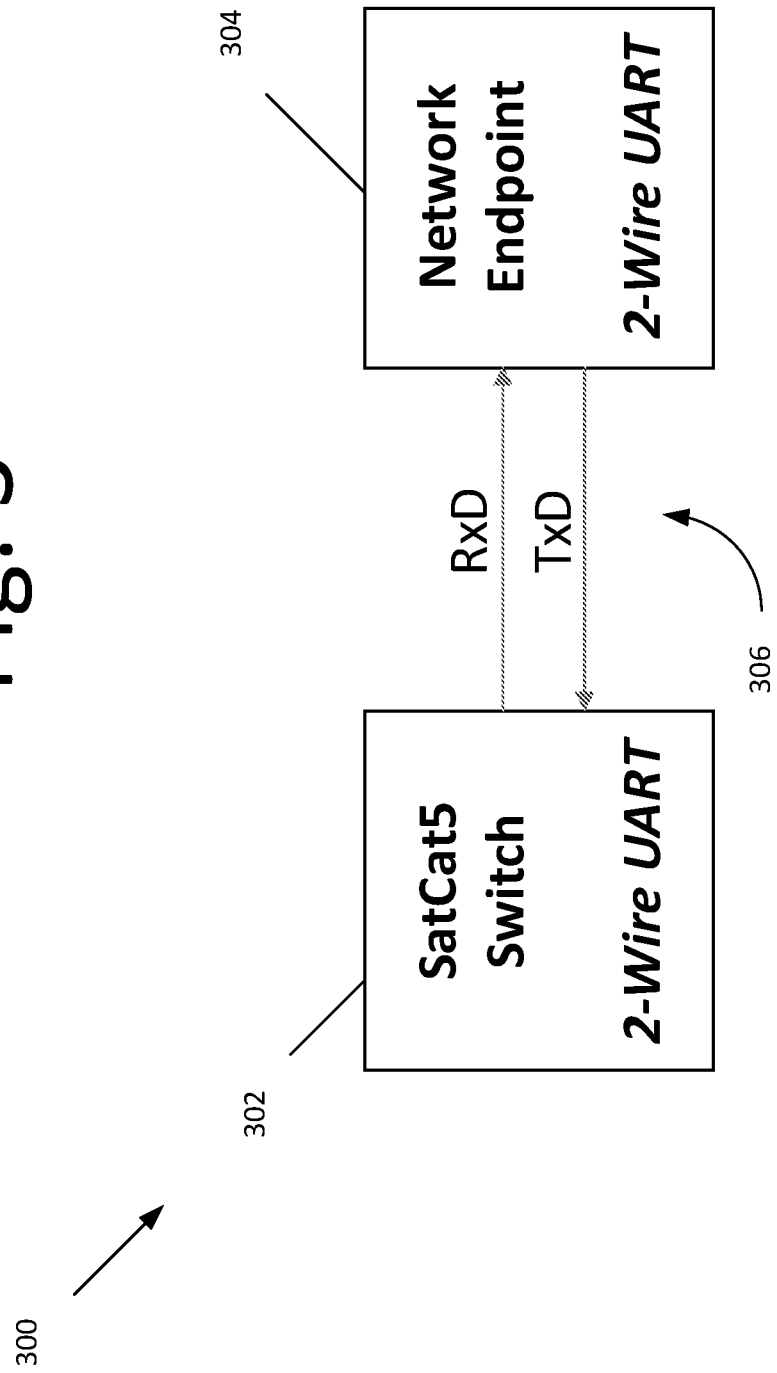
FIG. 3 is a block diagram illustrating a network comprising a switch, a network endpoint, and a two-wire UART interface, according to an embodiment of the present invention.

FIG. 3 is a block diagram illustrating a network 300 comprising a switch 302, a network endpoint 304, and a two-wire UART interface 306, according to an embodiment of the present invention. It should be appreciated that the embodiments are not limited to a two-wire UART interface 306 and other types of interfaces may be used depending on the embodiment.

UART interfaces are commonly used in short-distance communication, most commonly to connect computers to terminals, microcontrollers, or other devices. In certain embodiments, UART interface 306 conveys Ethernet frames between network endpoint 304 and switch 302. In an embodiment, network endpoint 304 is a microcontroller with a UART interface, switch 302 is an FPGA running SatCat5, and octets transferred through UART interface 306 are SLIP-encoded (IETF-RFC-1055) to delimit the start and end of each Ethernet frame. Similar to SPI network 300, flow control signaling from network endpoint 304 to switch 302 is essential. In this embodiment, flow control is signaled by polling. Network endpoint 304 sends data if and only if it is ready to receive data in turn; switch 302 is permitted to send a frame for a brief window after it receives each SLIP inter-frame token.

Figure 4:
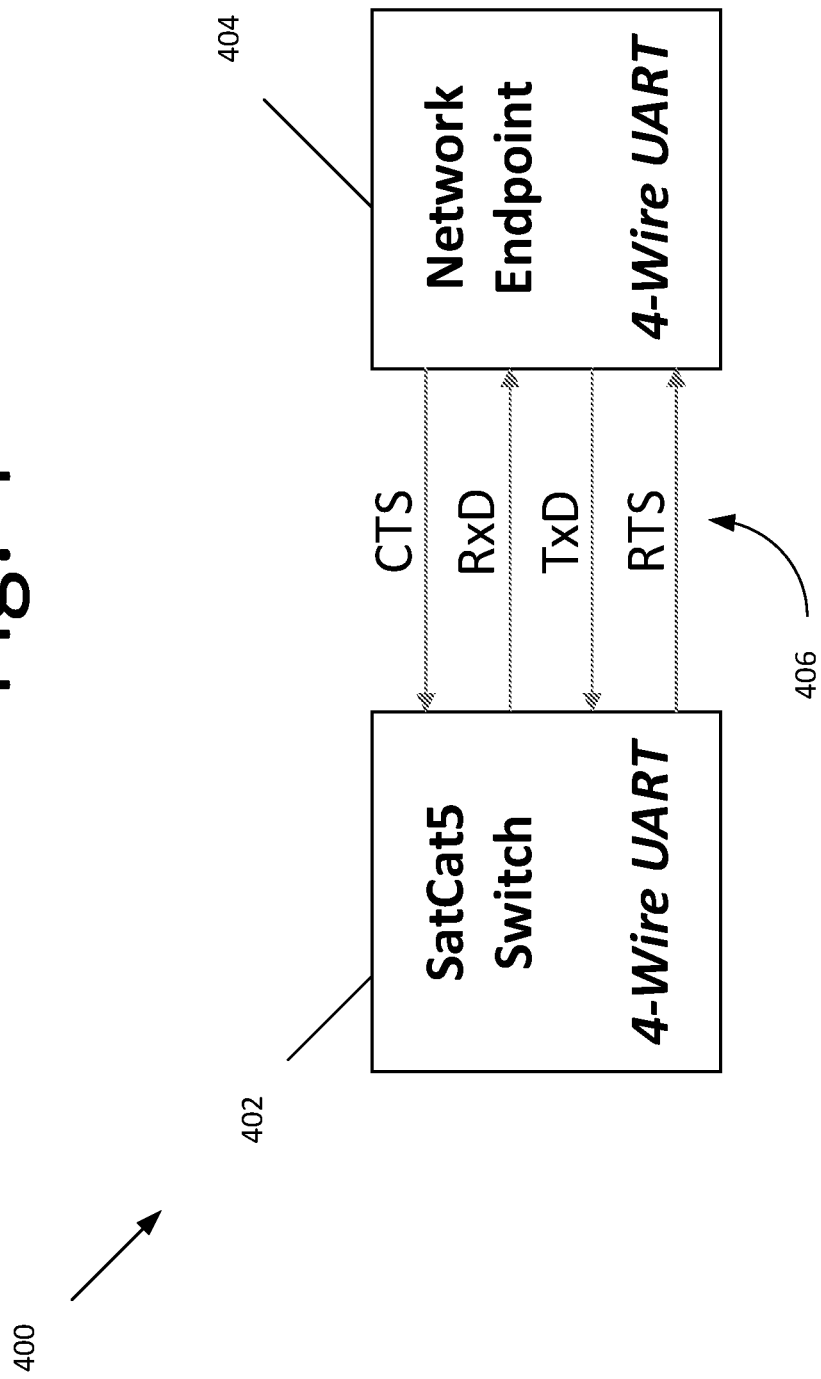
FIG. 4 is a block diagram illustrating a network comprising a FPGA, a network endpoint, and a four-wire UART interface, according to an embodiment of the present invention.

FIG. 4 is a block diagram illustrating a network 400 comprising a FPGA 402, a network endpoint 404, and a four-wire UART interface 406, according to an embodiment of the present invention. Four-wire UART interface 406 is similar to two-wire equivalent 306 as described above. However, Four-wire UART interface 406 adds explicit flow control signals RTS and CTS. The RTS signal is asserted by switch 402 to indicate that there are one or more queued Ethernet frames waiting to be sent. The CTS signal is asserted by network endpoint 404 when it is ready to accept this data from the switch.

In some embodiments, the switch includes features designed to reduce Ethernet frame-encoding overhead. For example, the IEEE 802.3 standard requires that Ethernet frames have a minimum length of 64 octets and an inter-packet gap of at least 12 octets. Such rules are widely accepted when communicating at gigabit rates, but compliance can add prohibitive throughput overhead when using lower-speed nontraditional media. In some embodiments, length and gap rules are relaxed for ports using nontraditional media. In some embodiments, the switch modifies packets traversing from a nontraditional-medium to a traditional-medium, so that the modified packets fully comply with the IEEE standard on ports that require it. For example, when the switch receives frames shorter than 64 octets, it may pad the frame with zeros (up to the required minimum length) prior to transmission over a traditional medium.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A mixed-media Ethernet switch (the "switch") configured to allow a variety of devices to communicate on a given network, further comprising:
   a plurality of traditional ports and non-traditional ports, each of which are configured to connect with, and communicate with, either a corresponding traditional medium or non-traditional medium, wherein
   the traditional medium comprises interfaces defined by IEEE 802.3 or industry standards for Media-Independent Interfaces (MII),
   the non-traditional medium comprises interfaces for short distance communications in embedded systems,
   the non-traditional medium comprises one or more of serial peripheral interface (SPI), universal asynchronous receiver-transmitter (UART), or inter-integrated circuit (I²C),
   the switch comprising a field programmable array or an application-specific integrated circuit is configured to, via the plurality of traditional ports and non-traditional ports, transfer data between non-traditional medium and non-traditional medium, traditional medium and traditional medium, non-traditional medium and traditional medium, and traditional medium and non-traditional medium, and
   the switch is configured to reduce Ethernet frame-encoding overhead by ignoring minimum frame-size requirements normally required by the IEEE 802.3 standard.

2. The switch of claim 1, wherein the switch is further configured to deliver Ethernet frames over non-traditional medium.

3. The switch of claim 1, further comprising:
   one or more media-independent interfaces (MII) configured to allow a media access control (MAC) module to communicate with a specialized physical-layer transceiver (PHY), the specialized PHY comprising specialized circuitry to send and receive signals long distances over a specific medium in accordance with standards specified by IEEE working group.

4. The switch of claim 3, wherein the specialized PHY contains circuitry configured to send and receive signals long distances over the specific medium,
   the specific medium being copper or fiber-optic cables.

5. The switch of claim 1, wherein a media access control (MAC)-to-MAC mode is utilized causing the switch to provide high-speed gigabit Ethernet service.

6. The switch of claim 5, wherein, when the non-traditional medium is used, the switch provides lower-speed Ethernet service using reduced power.

7. The switch of claim 1, wherein, ports of all medium types are interconnected into a single Ethernet network.

8. The switch of claim 1, wherein, ports with the non-traditional medium are permitted to send and receive packets that are shorter than a standard minimum length.

9. The switch of claim 8, wherein, the short packets are zero-padded to the standard minimum length prior to sending the short packets through a port with the traditional medium.

10. A mixed-media Ethernet switch (the "switch") configured to allow a variety of devices to communicate on a given network, further comprising:
    a plurality of traditional ports and non-traditional ports, each of which are configured to connect with, and communicate with, a corresponding traditional medium or non-traditional medium; and
    a media access control (MAC)-to-MAC mode configured to provide high-speed Ethernet service for the traditional medium without using a specialized physical layer component (PHY), wherein
    the traditional medium comprises interfaces defined by IEEE 802.3 or industry standards for Media-Independent Interfaces (MII),
    the non-traditional medium comprises interfaces for short distance communications in embedded systems,
    the non-traditional medium comprises one or more serial peripheral interface (SPI), universal asynchronous receiver-transmitter (UART), or inter-integrated circuit (I²C),
    the switch comprising a field programmable array or an application-specific integrated circuit is configured to, via the plurality of traditional ports and non-traditional ports, transfer data between non-traditional medium and non-traditional medium, traditional medium and traditional medium, non-traditional medium and traditional medium, and traditional medium and non-traditional medium, and
    the switch is configured to deliver Ethernet frames over the non-traditional medium.

11. The switch of claim 10, further comprising:
    one or more media-independent interfaces (MII) to allow an Ethernet media access control (MAC) module to communicate with the specialized physical layer component (PHY), the specialized PHY comprising specialized circuitry to send and receive signals long distances over a specific medium in accordance with standards specified by IEEE working group.

12. The switch of claim 11, wherein the specialized PHY contains circuitry configured to send and receive signals long distances over the specific medium,
the specific medium being copper or fiber-optic cables.

13. The switch of claim 10, wherein the media access control (MAC)-to-MAC mode is utilized causing the switch to provide high-speed gigabit Ethernet service.

14. The switch of claim 13, wherein, when the non-traditional medium is used, the switch provides lower-speed Ethernet service using reduced power.

15. The switch of claim 10, wherein, ports of all medium types are interconnected into a single Ethernet network.

16. The switch of claim 1, wherein, ports with the non-traditional medium are permitted to send and receive packets that are shorter than a standard minimum length.

17. The switch of claim 16, wherein, the short packets are zero-padded to the standard minimum length prior to sending the short packets through a port with the traditional medium.

18. A mixed-media Ethernet switch (the "switch") configured to allow a variety of devices to communicate on a given network, further comprising:
a plurality of traditional ports and non-traditional ports, each of which are configured to connect with, and communicate with, a corresponding traditional medium or non-traditional medium wherein
the traditional medium comprises interfaces defined by IEEE 802.3 or industry standards for Media-Independent Interfaces (MII),
the non-traditional medium comprises interfaces for short distance communications in embedded systems,
the non-traditional medium comprises one or more serial peripheral interface (SPI), universal asynchronous receiver-transmitter (UART), or inter-integrated circuit ($I^2C$),
the switch comprising a field programmable array or an application-specific integrated circuit is configured to, via the plurality of traditional ports and non-traditional ports transfer data between non-traditional medium and non-traditional medium, traditional medium and traditional medium, non-traditional medium and traditional medium, and traditional medium and non-traditional medium, and
the switch is configured to deliver Ethernet frames over the non-traditional medium, and switch between non-traditional devices using the non-tradition medium and media access control (MAC)-to-MAC devices in a single network.

19. The switch of claim 1, further comprising:
a media access control (MAC)-to-MAC mode configured to provide high-speed Ethernet service for the traditional medium without using a specialized physical layer component (PHY).

20. The switch of claim 1, wherein the switch is configured to modify one or more packets traversing from the non-traditional medium to the traditional-medium.

21. The switch of claim 20, wherein the switch is configured to pad frames with zeros to satisfy the minimum frame-size requirement, for those frames shorter than 64 octets prior to transmission over the traditional medium.

* * * * *